Jan. 11, 1927.
R. H. BEACH
1,613,599
CARBURETOR
Filed Dec. 10, 1924
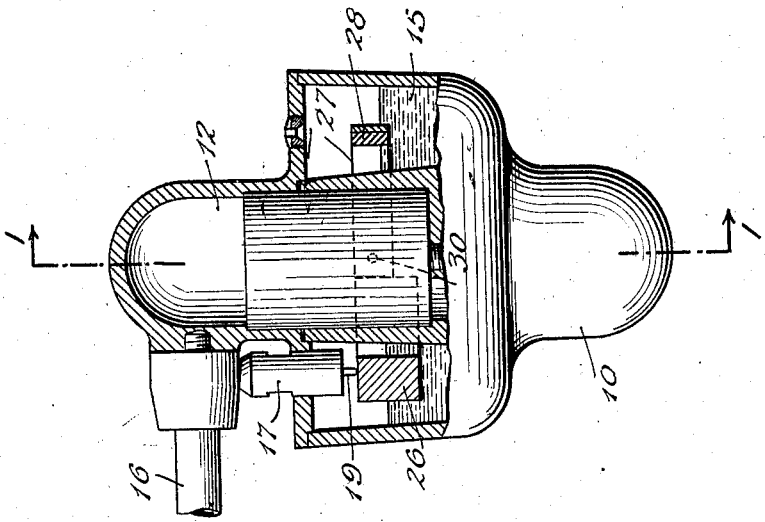
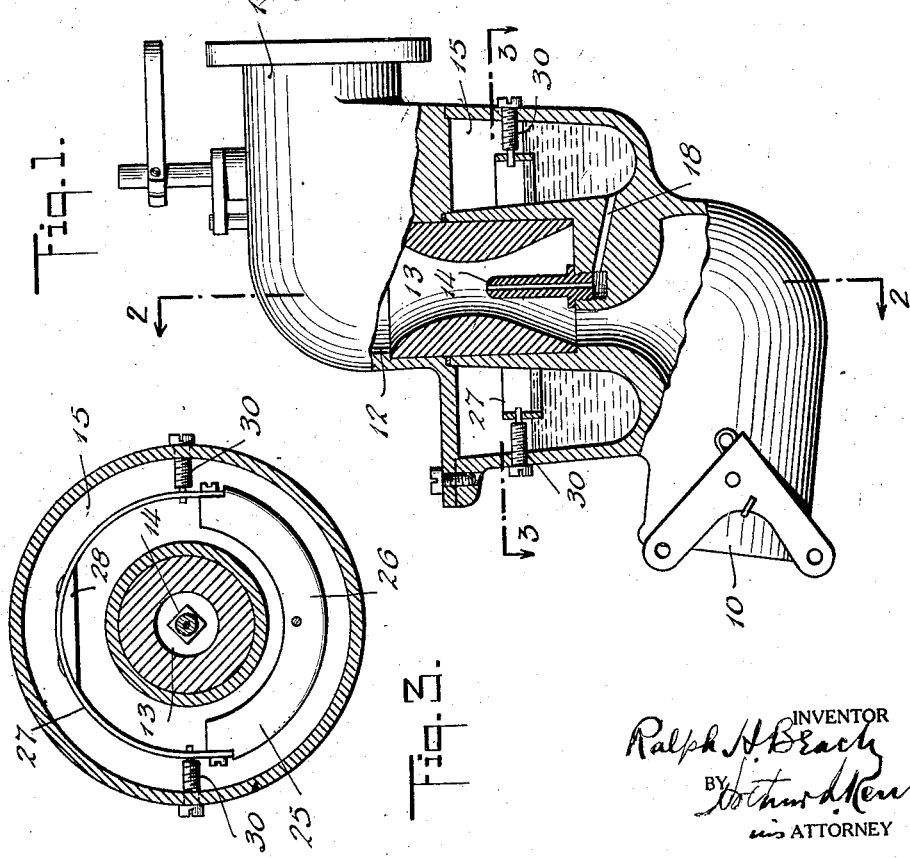
INVENTOR
Ralph H. Beach
BY
his ATTORNEY Patented Jan. 11, 1927.

1,613,599

UNITED STATES PATENT OFFICE.

RALPH H. BEACH, OF BELLEVILLE, NEW JERSEY.

CARBURETOR.

Application filed December 10, 1924. Serial No. 754,883.

This invention relates to carburetors, and more particularly to carburetor floats for controlling the inlet valve through which the fuel liquid enters the bowl or float chamber.

Thin-walled hollow metal floats have been usually used in carburetors. Such floats are relatively expensive and have the serious disadvantage that they are liable to develop leaks. Floats of cork and other light material have been used to some extent, and much effort has been devoted to finding a suitable substitute for the thin-walled hollow metal floats.

The present invention provides a carburetor float which is relatively inexpensive, is rugged and lasting, and is entirely reliable, and in addition possesses other important advantages over the carburetor floats heretofore used. The invention avoids the necessity of using a float member of less weight than the body of fuel liquid which is displaceable by it. Instead of such a relatively light floating body, a relatively heavy float member is used the weight in air of which is greater than that of the fuel liquid displaceable by it, and a counterbalancing or counteracting means is provided for exerting a lifting force on the float member less than the weight in air of the float member and greater than the submerged weight of the float member. The float is most desirably a pivoted float having a float member formed of a solid body of metal of relatively low specific gravity mounted at one side of the pivotal axis of the float, and a counteracting member of relatively high specific gravity and small displacement and of slightly less effective weight in air than the float member mounted on the other side of the pivotal axis.

A full understanding of the invention can best be given by a detailed description of an illustrative embodiment of the invention in the form now considered best, and such a description will now be given in connection with the accompanying drawings illustrating such an embodiment.

In said drawings:—

Fig. 1 is a view partly in side elevation and partly in vertical section of a carburetor provided with a float in accordance with the invention;

Fig. 2 is a view partly in section on line 2—2 of Fig. 1; and

Fig. 3 is a horizontal sectional view taken on line 3—3 of Fig. 1.

Referring to the drawings, the carburetor body is formed to provide an air inlet 10 and a mixture outlet 11 connected by a vertical passage 12. The vertical passage 12, as shown somewhat conventionally, is provided with a Venturi throat 13 and a vertical nozzle 14 set to discharge upwardly into the Venturi throat as is customary in carburetors. Surrounding the vertical passage is an annular bowl, or float chamber, 15 to which the fuel liquid is supplied from a supply pipe 16 through a valve body 17 and from which chamber the fuel liquid passes to the nozzle 14 through a passage 18. These parts may be of any desirable form and construction, and, as usual, the inlet valve (not shown) in the valve body 17 is controlled for maintaining the desired amount of fuel liquid in the float chamber by means of a float acting on a downwardly extending vertically movable valve stem 19, the inlet valve being closed when the stem is moved upward by the float, and opened when the stem is allowed to move downward.

The float 25 is of generally annular form, comprising a curved float member 26, and a curved flat strip 27 the ends of which are connected to the ends of the float member, and a counteracting member 28 attached to the middle portion of the strip 27. The float is pivotally mounted on pivot pins 30 and the pivotal axis extends diametrically of the float chamber, the float member 26 being at one side of the axis and positioned to engage the valve stem 19 as it moves upward, and the member 28 being on the other side of the axis. The float member is of greater weight than an equal volume of the fuel liquid, that is, its specific gravity is greater than that of the fuel liquid. It is most desirably a solid body of aluminum or other metal or other suitable material of relatively low specific gravity. The counteracting member 28 is adapted to exert a lifting force on the float member less than the weight in air of the float member and greater than its weight when submerged in the fuel liquid. When, as in the construction shown, the counteracting member 28 as well as the float member may be submerged in the fuel liquid, the member 28 is of a specific gravity sufficiently greater than the float member so that its displacement shall be so much smaller than that of the float member that its effective submerged weight shall be sufficient to overbalance the submerged weight of the float member. The member 28 is, therefore, most desirably a solid body of metal of high specific gravity, such as lead. The greater the submerged weight of the counteracting member 28, the greater will be the force under which the float member 26 tends to rise as the liquid level rises in the float chamber, that is, the force applied to close the inlet valve. As the effective weight in air of the member 28 must be less than the effective weight in air of the float member so that when the liquid level in the float chamber is low the float member will fall, the force under which the float member of a float such as shown rises when the liquid level rises depends upon the difference in specific gravity of the two members.

The lifting force of the counterbalanced float member of a float such as shown, with the float member made of aluminum and the counteracting member of lead, may be substantially greater than that of the usual hollow metal float in a float chamber of the same size. This is an important advantage of the present invention. A further advantage of the present device is that because of the relatively great total weight of the float, and its resulting increased inertia, as compared to the effective difference in weight on the two sides of the pivotal axis, the float is less responsive to small and quick movements of the fuel liquid or to vertical movement of its support. The float is thus much less affected by the jarring of a vehicle on which the carburetor is mounted than the ordinary form of float.

What is claimed is:

1. In a carburetor having an annular float chamber and a fuel inlet valve, a float for controlling the fuel inlet valve pivotally mounted in the float chamber with its pivotal axis extending substantially diametrically of the float chamber, said float comprising a float member at one side of the pivotal axis whose specific gravity is greater than that of the fuel liquid and a counteracting member on the other side of the pivotal axis of greater specific gravity than the float member but of smaller displacement than the float member, the effective weight in air of said counteracting member being less than the effective weight in air of the float member, and its effective weight when submerged in the fuel liquid being greater than the effective submerged weight of the float member.

2. In a carburetor having an annular float chamber and a fuel inlet valve, a float for controlling the fuel inlet valve pivotally mounted in the float chamber with its pivotal axis extending substantially diametrically of the float chamber, said float comprising a float member formed of a solid body of metal of relatively low specific gravity at one side of the pivotal axis and a counteracting member on the other side of the pivotal axis formed of a body of metal of relatively high specific gravity and of less effective weight in air than the float member.

3. In a carburetor, a pivotally mounted float for controlling the fuel inlet valve comprising a float member at one side of the pivotal axis the weight in air of which is greater than that of the fuel liquid displaceable by it, and a body on the other side of the pivotal axis of slightly less effective weight in air and of much smaller displacement than the float member.

4. In a carburetor, a pivotally mounted float for controlling the fuel inlet valve comprising a float member formed by a body of metal of low specific gravity at one side of the pivotal axis, and a counteracting body of metal on the other side of the pivotal axis of relatively high specific gravity and of less effective weight in air than the float member.

5. In a carburetor, a pivotally mounted float for controlling the fuel inlet valve comprising a float member at one side of the pivotal axis the weight in air of which is greater than that of the fuel liquid displaceable by it, and a counteracting body on the other side of the pivotal axis whose effective weight is less than the effective weight in air of the float member and greater than the effective submerged weight of the float member.

6. In a carburetor, a float for controlling the fuel inlet valve comprising a body of metal of low specific gravity, and means exerting a lifting force on said body less than the weight in air of the body and greater than the submerged weight of the body.

In testimony whereof I have hereunto set my hand.

RALPH H. BEACH.